United States Patent Office 3,377,406
Patented Apr. 9, 1968

3,377,406
PROCESS OF ESTERIFICATION OF POLYEPOXIDES WITH ETHYLENICALLY UNSATURATED MONOCARBOXYLIC ACIDS IN THE PRESENCE OF ONIUM SALTS OF INORGANIC ACIDS
Herbert A. Newey, Lafayette, and Clayton A. May, Orinda, Calif., assignors to Shell Oil Company, New York, N.Y., a corporation of Delaware
No Drawing. Filed Dec. 16, 1963, Ser. No. 330,618
13 Claims. (Cl. 260—837)

This invention relates to a process for preparing polyesters and the resulting products. More particularly, the invention relates to a new process for preparing hydroxy-substituted polyesters from polyepoxides, to the resulting products and to their use particularly in the preparation of coatings, adhesives, reinforced plastics, moldings and the like.

Specifically, the invention provides a new and highly efficient process for preparing an acetone-soluble hydroxy-substituted polyesters from acids and polyepoxides which can be accomplished at a rapid rate and with high yields of product. The process comprises heating and reacting the polyepoxide possessing more than one vic-epoxy group, and preferably a glycidyl polyether of a polyhydric phenol, with controlled quantities of an organic carboxylic acid, and preferably an ethylenically unsaturated monocarboxylic acid such as methacrylic acid, in the presence of an onium salt such as, for example, a phosphonium, sulphonium and ammonium salt, and recovering the desired acetone-soluble polyester.

As a special embodiment, the invention provides a new process for preparing soluble hydroxy-substituted polyethylenically unsaturated polyester of the formula

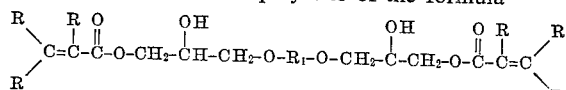

wherein R and $R_1$ are as described hereinafter by reacting a glycidyl polyether of a polyhydric phenol with an acrylic acid in the presence of one of the above-described onium salts.

Cured polyepoxides have many desired properties, such as solvent and chemical resistance and good adhesion to metal, and there has been a desire to transfer many of such properties over to the conventional polyester type products. We have found that this can be accomplished by reaction of the polyepoxides with an unsaturated monocarboxylic acid, such as acrylic or methacrylic acid. The products prepared in this manner are easily handled, combine readily with extenders, such as styrene, and cure in the presence of peroxide catalysts to form products having the desired characteristics of the polyepoxides as well as those of the unsaturated polyesters.

The known methods for making these new polyesters, however, have not been satisfactory for use on a large commercial scale. One way of making the polyesters, for example, is to merely heat the polyepoxide with the free acid. This technique, however, takes considerable time and gives low yield of product. Other methods involve the use of catalysts which are very expensive or interfer in some way with the desired properties of the resulting products.

It is an object of the invention, therefore, to provide a new process for preparing hydroxy-substituted polyesters. It is a further object to provide a new process for preparing polyesters from polyepoxides and organic carboxylic acids. It is a further object to provide a process for preparing polyesters from polyepoxides which can be completed in a short period of time. It is a further object to provide an economical method for preparing acetone-soluble polyesters from polyepoxides in high yields. It is a further object to provide a process for preparing unsaturated polyesters useful for coatings adhesives and molding applications. These and other objects of the invention will be apparent from the following detailed description thereof.

It has now been discovered that these and other objects may be accomplished by the process of the invention comprising heating and reacting a polyepoxide possessing more than one vic-epoxy group and preferably a glycidyl polyether of a polyhydric phenol with controlled quantities of an organic carboxylic acid in the presence of an onium salt such as for example a phosphonium, sulphonium and ammonium salt and recovering the desired acetone-soluble polyester. It has been found that by the use of this method one can prepare the polyesters in a very rapid manner and with a high yield of product. Further the resulting polyesters are easily handled highly compatible with other monomers such as styrene and can easily be cured with peroxide catalysts to form coatings and the like having excellent resistance to solvents, chemicals and water and having good flexibility and toughness. As a result the new products are particularly suited for use in making coatings adhesives reinforced plastics moldings and the like.

The polyepoxides used in the process of the invention comprise those compounds possessing more than one vic-epoxy group i.e. more than one $$-\overset{\text{O}}{\underset{\diagup \diagdown}{\text{C}\,\text{---}\,\text{C}}}-$$

group. These polyepoxides may be saturated or unsaturated aliphatic, cycloaliphatic, aromatic or heterocyclic and may be substituted if desired with non-interfering substituents such as halogen atoms hydroxy groups ether radicals and the like. They may also be monomeric or polymeric.

For clarity many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the glycidyl ethers of novolac resins, i.e. phenol-aldehyde condensates. Preferred resins of this type are those of the formula:

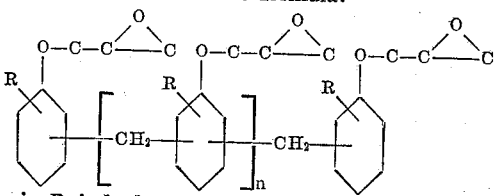

wherein R is hydrogen or an alkyl radical and $n$ is an integer of 1 to about 10. Preparation of these polyepoxides is illustrated in U.S. 2,216,099 and U.S. 2,658,885.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecandienoate, butyl 9,12,15-octadecatrienoate, butyl eleostearate, monoglycerides of tung oil fatty acids monoglycerides of soybean oil, sunflower, rapeseed, hempseed, sardine, cottonseed oil, and the like.

Another group of the epoxy-containing materials used in the process of the invention including the epoxidized esters of unsaturated monohydric alcohols and polycarboxylic acids, such as, for example, di(2,3-epoxybutyl) adipate, di(2,3-epoxybutyl)oxalate, di(2,3-epoxyhexyl) succinate, di(3,4-epoxybutyl)maleate, di(2,3-epoxyoctyl) pimelate, di(2,3-epoxybutyl)phthalate, di(2,3-epoxyoctyl) tetrahydrophthalate, di(4,5-epoxydodecyl)maleate, di(2,3-epoxybutyl)terephthalate, di(2,3-epoxypentyl)thiodipropionate, di(5,6-epoxytetradecyl)diphenyldicarboxylate, di(3,4-epoxyhepthyl)sulfonyldibutyrate, tri(2,3-epoxybutyl) 1,2,4-butanetricarboxylate, di(5,6-epoxypentadecyltartrate, di(4,5 - epoxytetradecyl)maleate, di(2,3-epoxybutyl)azelate, di(3,4-epoxybutyl)citrate, di(5,6-epoxyoctyl)cyclohexane-1,3-dicarboxylate, di(4,5-epoxyoctadecyl)malonate Another group of the epoxy-continuing materials include those epoxidized esters of unsaturated alcohols and unsaturated carboxylic acids, such as glycidyl glycidate, 2,3-epoxybutyl 3,4-epoxypentanoate; 3,4-epoxyhexyl, 3,4-epoxypentanoate; 3,4-epoxycyclohexyl 3,4-epoxycyclohexyl methyl epoxycyclohexane carboxylate.

Still another group of the epoxy-containing materials include epoxidized derivatives of polyethylenically unsaturated polycarboxylic acids, such as, for example, dimethyl 8,9,12,13-diepoxyeicosanedioate;
dibutyl 7,8,11,12-diepoxyoctadecanedioate;
dioctyl 10,11-diethyl-8,9,12,13-diepoxy-eicosanedioate;
dihexyl 6,7,10,11-diepoxyhexadecanedioate;
didecyl 9-epoxy-ethyl-10,11-epoxyoctadecanedioate;
dibutyl 3-butyl-3,4,5,6-diepoxycyclohexane-1,2-dicarboxylate;
dicyclohexyl 3,4,5-6-diepoxycyclohexane-1,2-dicarboxylate;
dibenzyl 1,2,4,5-diepoxycyclohexane-1,3-dicarboxylate and diethyl 5,6,10,11-diepoxyoctadecyl succinate.

Still another group comprises the epoxidized polyester obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)-propane, epoxidized vinyl cyclohexene and epoxidized dimer of cyclopentadiene.

The other component in the reaction comprises an organic carboxylic acid which may be saturated, unsaturated, aliphatic, cycloaliphatic or aromatic, and may be monocarboxylic or polycarboxylic. The preferred acids to be employed are the monocarboxylic acids, such as acetic acid, propionic acid, benzoic acid, toluic acid, cyclohexanecarboxylic acid, methylcyclohexanecarboxylic acid, cyclopentanecarboxylic acid, acrylic acid, methacrylic acid, stearic acid, lauric acid, dodecanoic acid, chloracetic acid, phenoxyacetic acid and the like.

Particularly preferred acids to be utilized comprise the ethylenically unsaturated acids such as, for example, acrylic acid, methacrylic acid, crotonic acid, alpha-phenylacrylic acid, alpha-cyclohexylacrylic acid, maleic acid, alpha-chloromaleic acid, tetrahydrophthalic acid, itaconic acid, fumaric acid, cyanoacrylic acid, methoxyacrylic acid, and the like.

Also particularly preferred are the partial esters of polycarboxylic acids, and particularly the alkyl, alkenyl, cycloalkyl and cycloalkenyl esters of polycarboxylic acids such as, for example, allyl hydrogen maleate, butyl hydrogen maleate, allyl hydrogen phthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

Coming under special consideration, particularly because of the superior coating properties of the resulting unsaturated polyesters, are the ethylenically unsaturated monocarboxylic acids and unsaturated partial esters, and especially the unsaturated aliphatic monocarboxylic acids containing 3 to 10 carbon atoms, and the alkenyl and alkenyl esters of alkenedioic acids containing up to 12 carbon atoms.

The special catalyst to be utilized in the process comprise the onium salts, and preferably those containing phosphorous, sulfur or nitrogen, such as, for example, the phosphonium, sulfonium and ammonium salts of inorganic acids. Examples of these include, among others, benzyltrimethylammonium sulfate,
benzyltrimethylammonium nitrate,
diphenyldimethylammonium chloride,
benzyltrimethylammonium chloride,
diphenyldimethylammonium nitrate,
diphenylmethylsulfonium chloride,
tricyclohexylsulfonium bromide,
triphenylmethylphosphonium iodide,
diethyldibutylphosphonium nitrate,
trimethylsulfonium thiocyanate,
triphenylsulfonium chloride,
dicyclohexyldiamylphosphonium iodide,
benzyltrimethylammonium thiocyanate,
and the like, and mixtures thereof.

Preferred onium salts to be employed include those of the formulae

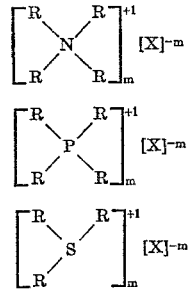

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, and $m$ is the valency of the X ion and is an integer of 1 to 3.

The amount of the above-noted polyepoxide and acid to be used in the reaction may vary over a wide range. In general, these reactants are used in approximately chemically equivalent amounts. As used herein and in the appended claims a chemical equivalent amount of the polyepoxide refers to that amount needed to furnish one epoxy group per carboxyl group. Excess amounts of either reactant can be used. Preferred amounts range from about 0.5 to 2 equivalents of epoxide per equivalent of carboxylic acid.

The amount of the catalyst employed may also vary over a considerable range. In general, the amount of the catalyst will vary from about .05% to about 3% by weight, and more preferably from .1% to 2% by weight of the reactants.

The reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent may be retained in the reaction mixture. Otherwise, the solvent can be removed any suitable method such as by distillation and the like. If the product is not to be used for sometime after its formation, it may also be desirable to remove the catalyst used in the preparation, such as by stripping and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about .020 eq./100 g. or below.

The process of the invention may be effected in any suitable manner. The preferred method merely comprises adding the polyepoxide, acid, catalyst, and solvent or diluent if desired, in any order and then applying the necessary heat to bring about the reaction. The reaction mixture may then be distilled or stripped to remove any of the necessary components, such as solvents, catalyst, excess reactants and the like.

The polyester products obtained by the above process will vary from liquids to solid resins. The new products will possess a plurality of free OH groups, and in the case of the unsaturated acids, possess a plurality of ethylenic groups, and will be reactive through these groups. The products will be of higher molecular weight than the basic polyepoxide from which they are formed and will possess at least two acid groups per polyepoxide unit.

The new polyesters will also possess a linear structure, i.e., free of cross-linking. As a result they will be soluble in acetone and other conventional solvents. They will be relatively non-heat reactive, i.e., difficult to body by heating alone. However, constant application of heat may cause them to suddenly gel.

The new polyesters will be compatible and soluble in a great variety of different materials. They will be compatible, for example, with various oils, tars, resins and the like, and with a great variety of different types of unsaturated monomers. Examples of such monomers include, among others, aromatic compounds such as styrene, alpha-methylstyrene, dichlorostyrene, vinyl naphthalene, vinyl phenol and the like, unsaturated esters, such as acrylic and methacrylic esters, vinyl acetate, vinyl benzoate, vinyl chloroacetate, vinyl laurate, and the like, unsaturated acids, such as acrylic and alpha-alkylacrylic acids, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl maleate, divinyl adipate, dichloroallyl tetrahydrophthalate, and the like, and mixtures thereof.

The new hydroxy-substituted polyesters may be polymerized alone in combination with any of the above-noted unsaturated monomers to form valuable polymeric products. When used in combination with the above components, the amount of the other component may vary over a wide range, but it is generally preferred to have at least 15% by weight of the polyester present. In working with components, such as the aromatic unsaturated monomers, such as styrene, it is preferred to utilize from 1% to about 65% of the dissimilar monomer and from 99% to 35% of the new hydroxy-substituted polyester.

mixtures of monomers may be accomplished by any suitable method. The preferred method comprises heating the monomer or mixture of monomers in the presence of a free radical yielding catalyst. Examples of such catalysts includes the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, Tetralin hydroperoxide, phenylcyclohexane hydroperoxide, tertiary butylisopropylbenzene hydroperoxide, tertiary butyl peracetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobiisobutyrate, 2,2'-azobis (2,4-dimethylvaleronitrile, 2,2'-azobiisotulyamide, and the like. Particularly preferred catalysts include the diaroyl peroxide, tertiary alkyl hydroperoxides, alkyl peresters of percarboxylic acids and particularly those of the above-noted groups which contain no more than 18 carbon atoms per molecular and have a decomposition temperature below 125° C.

Other materials may also be added to the mixtures before or during polymerization. This includes plasticizers, stabilizers, extenders, oils, resins, tars, asphalts and the like, as well as all types of coloring or pigments to give the material the desired color.

The above-noted components may be mixed in any order and then the combined mixture heated to the desired temperature. Temperatures employed in the polymerization will vary depending upon the reactants and catalyst selected. In general, polymerization temperatures may vary from about 20° C. to about 200° C. and more preferably from 20° C. to 125° C.

The unsaturated polyesters and their above-noted mixtures with other monomers may be utilized in a wide variety of different applications. They may be utilized in the preparation of coatings and impregnating compositions, in the preparation of adhesives for metals, wood, cement and the like, and in the preparation of reinforced composite products, such as laminated products, filament windings and the like. In this latter application, the polyester compositions are applied to the fibrous products, such as glass fibers or sheets, the material formed into the desired object and heated to effect cure of the polyester composition.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight. The polyepoxides referred to herein by letter are those set out in U.S. Patent 2,633,458.

EXAMPLE I

This example illustrated the preparation of a hydroxy-substituted unsaturated polyester by the process of the invention using Polyether A, methacrylic acid and tetramethyl ammonium chloride.

68.8 parts of Polyether A were combined with 31.2 parts of glacial methacrylic acid and 0.43 parts of tetramethyl ammonium chloride and the mixture heated at 115° C. for 1 hour and 15 minutes. During that time, the acidity changed from 0.362 eq./100 g. to about 0.017 eq./100 g. indicating there was substantially complete reaction. The resulting product was an acetone soluble viscous liquid polyester identified as having the following structure

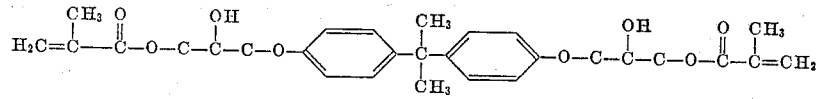

The polymerization of the above-noted polyesters or The yield was 100%.

In a related experiment wherein an equal molar quantity of benzyldimethylamine was used as the catalyst for the reaction in place of the tetramethyl ammonium chloride, the time for completion of the reaction was 4 hours and 45 minutes.

The polyester prepared above using the tetramethyl ammonium chloride was combined with 0.5% ditertiary butyl peroxide and the mixture heated at 115° C. The resulting product was a hard tough solvent and chemical resistant product.

The polyester prepared above using the tetramethyl ammonium chloride was also combined with styrene in a ratio of 95/5, 90/10, 80/20 and 60/40, and the mixtures combined with .5% ditertiary butyl peroxide and heated at 115° C. These products were also hard and tough and had good resistance to chemicals, solvents and water. The product obtained from the 95/5 mixture cured 1% ditertiary butyl peroxide at 2 hours at 135° C. had a heat distortion point of 143° C.

The styrene diluted product is also useful in the preparation of glass finer laminated products.

EXAMPLE II

Example I was repeated with the exception that the catalyst employed was an equal molar amount of triphenylmethyl phosphonium iodide. In this case the acid number was reduced from .362 to .015 in about 1 hour. The resulting product was the same type of acetone soluble viscous liquid polyester as in Example I and gave the same type of cured products as in Example I.

EXAMPLE III

Example I was repeated with the exception that the catalyst employed was an equal molar amount of trimethylsulfonium bromide. In this case, the reaction was complete in about 1 hour and 15 minutes. The resulting polyester had the same structure and gave the same type of cured products as in Example I.

EXAMPLE IV

Example I was repeated with the exception that the catalyst employed was an equal molar quantity of benzyltrimethylammonium chloride. The reaction was faster than with a similar quantity of benzyldimethylamine. The resulting polyester had the same properties as that in Example I and gave the same type of cured product.

EXAMPLE V

Example I was repeated with the exception that the catalyst employed was an equal molar quantity of trimethylsulfonium thiocyanate. The reaction was faster than with an equal amount of benzyldimethylamine. The resulting polyester had the same properties as that in Example I and gave the same type of cured product.

EXAMPLE VI

Example I was repeated with the exception that the catalyst employed was an equal molar quantity of triphenylsulfonium chloride (50% in propylene glycol). The reaction was complete in about 1 hour. The resulting polyester had the same properties as that in Example I and gave the same type of cured product.

EXAMPLE VII 68.8 parts of Polyether A was combined with 31.2 parts of glacial methacrylic acid and 1.046 parts of hydroxyethyl trimethyl ammonium chloride. The mixture was heated to 115° C. for 1 hour. During this time, the acidity dropped from 0.362 eq./100 g. to 0.012 eq./100 g. The resulting product was an acetone-soluble viscous polyester as in Example I.

EXAMPLE VIII

This example illustrates the preparation of a hydroxy-substituted unsaturated polyester by the process of the invention using Polyether B, methacrylic acid and benzyltrimethylammonium chloride.

468 parts of Polyether B was combined with 172 parts of glacial methacrylic acid and .5% of benzyltrimethylammonium chloride and the mixture heated at 115° C. for about 1 hour and 30 minutes. During that time, the acidity changed from .311 to 0.004 indicating that the reaction was substantially complete. The resulting product was an acetone-soluble very thick unsaturated polyester having the following analysis:

| | Eq./100 g. |
|---|---|
| Epoxy value | 0.008 |
| Hydroxyl value | 0.39 |
| Acidity | 0.004 |
| Ester value | 0.282 |

The polyester prepared above was combined with .5% ditertiary butyl peroxide and the mixture heated to 115° C. The reuslting product was a hard, tough and solvent insoluble casting.

The above polyester was also combined with styrene in a ratio of 95/5, 90/10, 80/20 and 60/40 and the mixtures combined with .5% ditertiary butyl peroxide and heated at 115° C. The resulting products were hard and tough chemical resistant products.

EXAMPLE IX

Examples I to VIII are repated using acrylic acid in place of methacrylic acid. Related results are obtained.

EXAMPLE X 350 parts of a glycidyl polyether of 2,2-bis(4-hydroxyphenyl)propane having a molecular weight of 1060 and an epoxy value of 0.154 eq./100 g. (Epon 1002) was combined with 70.5 parts of glacial methacrylic acid and .5% of tetramethylammonium chloride. This mixture was heated at 100° C. for 3¾ hours. The resulting product was acetone-soluble solid polyester having the following analysis:

| | |
|---|---|
| Ester value | 0.128 eq./100 g. |
| Hydroxy value | 0.39 eq./100 g. |
| Molecular weight | 1270 |
| Acid value | 0.009 eq./100 g. |
| Epoxy value | 0.012 eq./100 g. |

50 parts of the polyester prepared above was combined with 50 parts of styrene and .5 part of benzoyl peroxide and the mixture heated to 100° C. The resulting product was a hard tough solvent resistant casting.

EXAMPLE XI 465 parts of a glycidyl polyether of brominated 2,2-bis(4-hydroxyphenyl)propane was combined with 107.5 parts of glacial methacrylic acid and .5% of tetramethylammonium chloride. This mixture was heated to 110° C. The acidity dropped from 0.217 eq./100 g. to 0.002 in about 1¾ hours. The resulting product was an acetone-soluble polyester which could be easily polymerized with styrene to form hard tough solvent resistant castings.

EXAMPLE XII

Examples I to XI are repeated using allyl hydrogen maleate in place of methacrylic acid. Related results are obtained.

EXAMPLE XIII

The polyester prepared in Example I was used as a molding material using the following recipe:

| | Parts |
|---|---|
| Polyester | 160 |
| Styrene | 40 |
| p-Benzoquinone | 0.2 |
| Tertiary butyl hydroperoxide | 4.0 |
| Zinc stearate | 4.0 |
| Kaolin (china clay) | 400 |

The mixture was used to form a molding and cured at 270° F. Very attractive moldings were obtained.

EXAMPLE XIV

Example I is repeated with the exception that the glycidyl ether is replaced by an equivalent amount of a glycidyl ether of a phenol-formaldehyde resin having a molecular weight between 550–650 and an epoxy value of 0.56 eq./100 g. The resulting product could be polymerized with styrene to form a hard tough solvent resistant casting.

We claim as our invention:

1. A process for preparing an acetone-soluble hydroxy-substituted ethylenically unsaturated polyester which consists of heating and reacting a glycidyl ether of a polyhydric compound with an ethylenically unsaturated monocarboxylic acid in a chemically equivalent ratio of 0.5 to 2:1 in the presence of from 0.01% to 5% by weight of a hydrocarbyl substituted onium salt of an inorganic acid at a temperature of about 50° C. to 150° C.

2. A process as in claim 1 wherein the acid is an alkenoic acid containing 3 to 10 carbon atoms.

3. A process as in claim 1 wherein the onium salt has the structure

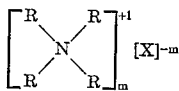

wherein R is a hydrocarbon radical, X is an ion of an inorganic acid having a valency of $m$, $m$ being an integer of 1 to 3.

4. A process as in claim 1 wherein the onium salt has the structure

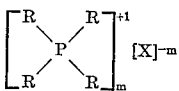

wherein R is a hydrocarbon radical and X is an ion of an inorganic acid having a valency of $m$, $m$ being an integer of 1 to 3.

5. A process as in claim 1 wherein the onium salt has the structure

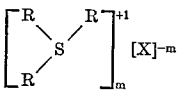

wherein R is a hydrocarbon radical and X is an ion of an inorganic acid having a valency of $m$, $m$ being an integer of 1 to 3.

6. A process as in claim 1 wherein the glycidyl ether is a glycidyl polyether of 2,2-bis(4-hydroxyphenyl)propane.

7. A process as in claim 1 wherein the onium salt is phenyltrimethylammonium chloride.

8. A process as in claim 1 wherein the onium salt is tetramethylammonium chloride.

9. A process as in claim 1 wherein the onium salt is triphenylsulfonium chloride.

10. A process as in claim 1 wherein the onium salt is triphenylmethylphosphonium chloride.

11. A process as in claim 1 wherein the onium salt is hydroxyethyl trimethyl ammonium chloride.

12. A process for making new unsaturated polyesters which consists of heating and reacting methacrylic acid with a glycidyl polyether of 2,2-bis(4-hydroxyphenyl)propane in an equivalent ratio of 0.5 to 2:1 in the presence of .01% to 5% by weight of a hydrocarbon substituted quaternary ammonium salt of an inorganic acid at a temperature of about 50° C. to 150° C.

13. A process which consists of heating and reacting methacrylic acid with a glycidyl ether of a phenol-formaldehyde condensate in an equivalent ratio of 0.5 to 2:1 in the presence of a hydrocarbon substituted quaternary ammonium salt of an inorganic acid at a temperature of about 50° C. to 150° C.

References Cited

UNITED STATES PATENTS

| 2,541,670 | 2/1951 | Segall et al. | 260—348 |
| 2,604,464 | 7/1952 | Segall et al. | 260—86.7 |
| 2,752,269 | 6/1956 | Condo et al. | 260—47 |
| 2,890,202 | 6/1959 | Parker | 260—47 |
| 2,928,807 | 3/1960 | Belanger | 260—47 |
| 2,970,983 | 2/1961 | Newey | 260—18 |
| 3,035,001 | 5/1962 | Tinsley et al. | 260—18 |
| 3,053,855 | 9/1962 | Maerker | 260—348 |
| 3,075,999 | 1/1965 | June et al. | 260—348 |
| 3,178,454 | 4/1965 | Kloos et al. | 260—348 |

DONALD E. CZAJA, *Primary Examiner.*

LEON J. BERCOVITZ, *Examiner.*

C. W. IVY, *Assistant Examiner.*